United States Patent [19]

Luh et al.

[11] 3,879,568
[45] Apr. 22, 1975

[54] PROCESS FOR DEHYDRATING BANANAS AND BANANA PRODUCT

[75] Inventors: Nancy N. R. Luh, Cambridge; James K. Palmer, Sharon, both of Mass.

[73] Assignee: Massachusetts Institute of Technology, Cambridge, Mass.

[22] Filed: June 25, 1973

[21] Appl. No.: 373,104

[52] U.S. Cl. ............... 426/541; 426/455; 426/465; 426/473; 426/510; 426/547; 426/640; 426/615
[51] Int. Cl. ............................................. A23b 7/06
[58] Field of Search ........... 426/148, 151, 262, 268, 426/227, 228, 328, 335, 455, 465, 473, 510, 509

[56] References Cited
UNITED STATES PATENTS

| | | | |
|---|---|---|---|
| 1,138,887 | 6/1914 | Plunkett | 426/510 |
| 2,192,273 | 3/1940 | Rey | 426/148 |
| 2,507,564 | 8/1945 | Foote | 426/268 |
| 3,259,508 | 7/1966 | Aguirre | 426/473 |

Primary Examiner—Raymond N. Jones
Attorney, Agent, or Firm—Kenway & Jenney

[57] ABSTRACT

This invention provides a process for preparing a dehydrated banana which comprises slicing the fruit of a ripe banana along its length from 1 to 3 times to form lengthwise peeled banana slices having the carpel region exposed along their length, contacting the slices with steam to increase the temperature of the interior of the slices up to about 85°C to 95°C and maintaining that temperature for about 1/2 to 4 minutes, and dehydrating said steam blanched slices at a temperature from 50°C to 65°C to reduce the moisture content of the banana slices to less than about 20%. The slices are contacted with steam before they are substantially discolored due to enzymic discoloration. The product obtained thereby retains a substantial portion of the characteristic cellular structure of the banana, is substantially free of enzymic discoloration, has a water activity of less than about 0.6, and is rehydratable to yield a product with an appearance, texture, color, aroma and flavor similar to that of fresh ripe banana pulp. The dehydrated product retains those properties for at least 3 months under normal storage conditions.

12 Claims, No Drawings

PROCESS FOR DEHYDRATING BANANAS AND BANANA PRODUCT

BACKGROUND OF THE INVENTION

This invention relates to a process for dehydrating bananas and the dehydrated banana products obtained thereby.

At the present time there are available a wide variety of techniques for dehydrating bananas. For example, pureed bananas have been subjected to steam blanching to inactivate the enzyme therein which causes browning discoloration of the fruit when contacted with free oxygen. The blanched banana puree then is dehydrated by heating, until the desired low moisture content is obtained. The process is undesirable since the banana adheres to the apparatus employed during processing. The product obtained by this process is undesirable since it does not resemble the normal structure of bananas. In addition, the banana flakes produced must be dehydrated to a moisture content of about 2.6% to prevent agglomeration of the flakes. Banana at these low moisture levels are difficult to rehydrate so that when rehydrated, they will remain hard and will not have the texture and softness of the original fruit. Alternatively, it has been proposed to admix with the banana chemical additives such as sulfur dioxide or other sulphiting agents which have the effect of inhibiting the phenoloxidase or polyphenoloxidase enzyme in the fruit which causes browning discoloration. While such additives are effective to inhibit this enzymic browning, their use is undesirable since they impart an unpleasant sulphurous taste to the product. Another alternative procedure involves immersing the banana in an aqueous solution of a salt or sugar to affect osmotic withdrawal of about 50% of the water from the banana tissues, followed by further air dehydration to a low moisture content. However, even with this procedure, which partially inhibits enzymic browning, it has been found necessary to impregnate the banana with chemical additives such as sulfur dioxide or other sulphiting agents thereby causing the disadvantage described above.

While steam blanching is a commonly employed technique for inhibiting enzymic activity in vegetables, its use with fruits has been limited since steam blanching causes undesirable changes in the texture of the fruit tissue causing it to soften and collapse resulting in adherence of the treated fruit to the apparatus employed in the treatment and the formation of a product that does not resemble the original fruit. Accordingly, it has been proposed to partially dehydrate the fruit prior to steam blanching so that during the steam blanching step destruction of the fruit tissue caused by cell collapse is minimized. However, with bananas, when a preliminary dehydration step is conducted, even in the presence of chemical additives that inhibit enzymic browning, subsequent steam blanching followed by dehydration does not produce a banana product having satisfactory color. That is, it has been found that in such a process, enzymic browning occurs to an undesirable extent during the preliminary dehydration step.

Dehydrated banana products obtained by present processes either must be admixed with a chemical additive which inhibits the activity of the polyphenoloxidase or phenoloxidase enzymes or the banana product obtained is in a form which does not resemble the original fruit such as in flake form. In either case the product obtained is undesirable from a commercial standpoint for the reasons discussed above. With presently employed processes involving steam blanching, the texture of the banana is destroyed either by virtue of homogenizing the banana prior to steam blanching or by virtue of the conditions of time and temperature employed during the steam blanching step. The ripe banana fruit is quite soft but contains fibro-vascular bundles that are oriented in the lengthwise direction of the banana which provides some structural support for the banana. The relatively rigid cell walls provide additional support. In present processes, these bundles and cell walls are partially or wholly destroyed so that the texture of the original fruit is lost. In addition, many of the dehydrated banana products obtained by present processes do not retain the aroma and flavor of the original fruit or are not sufficiently rehydratable to form a soft banana product or discolor and/or develop off-odors after short periods of storage.

It would be highly desirable to provide a process for dehydrating bananas to obtain a banana product which is substantially free of enzymic discoloration, which permits retaining the basic structural features of a banana and which can be rehydrated within a relatively short period of time to a product having a color, texture, aroma and flavor which is similar to that of fresh, ripe banana pulp. The dehydrated product should retain these properties during storage.

SUMMARY OF THE INVENTION

The present invention is based upon the discovery that bananas can be dehydrated without significant enzymic discoloration to produce a dehydrated banana which retains a substantial portion of its original texture when rehydrated by slicing a ripe banana lengthwise 1 to 3 times to form lengthwise peeled banana slices having the carpel region exposed along their length, steam blanching the slices to heat the banana to a temperature between about 85°C and about 95°C for a period of time at that temperature from about ½ to about 4 minutes and thereafter dehydrating the blanched slices at a temperature of between about 50° and about 65°C until the moisture content of the dehydrated banana product obtained is below about 20 wt. %. The banana product obtained is substantially free of enzymic discoloration, largely retains the structural features of the original banana, has a water activity below about 0.6 and is rehydratable within a short period of time to a moisture content up to about 80% of the original banana moisture. The rehydrated banana has a color and texture much like the fresh ripe banana pulp and has a substantial proportion of the original banana aroma and flavor. The product retains these properties at normal storage temperature e.g. 25°C, for at least about 3 months when stored in closed clear glass containers.

DESCRIPTION OF SPECIFIC EMBODIMENTS

In accordance with the process of this invention, it is essential that the banana slices to be steam blanched be formed by cutting the whole banana lengthwise 1 to 3 times to expose the carpel region of the banana along its length and to form from two to six banana slices having about the same size. If desired, the banana also can be cut transversely once or twice to form relatively equally sized pieces either before or after lengthwise cutting in which instance the number of slices will be doubled or tripled. The transverse cut provides convenience in processing since the flat surfaces exposed by the transverse cut facilitate cutting the banana lengthwise. However, it is preferred not to cut the banana transversely more than once since this increases the risk that the texture of the banana will be destroyed during the subsequently-employed steam blanching step. The banana slices then are subjected to steam blanching by contacting with steam or a steam-air mixture, generally maintained at a temperature of between about 93° and 100°C, until the temperature of the interior of the banana slices attains a temperature from about 85°C to 95°C, and maintaining that temperature for a period of time from about ½ to 4 minutes. If the conditions during the steam blanching step are not sufficient to raise the banana temperature to about 85°C, a substantial portion of the polyphenoloxidase or phenoloxidase enzyme in the banana will remain active. On the other hand, if the conditions during the steam blanching step are substantially more severe than set forth above, the banana may become overcooked and the texture of the banana will be destroyed thereby causing the banana slices to form into a pasty mass with sticks to the trays or other apparatus in contact therewith. The banana slices obtained from the steam blanching step in accordance with this invention have substantially all of the polyphenoloxidase or phenoloxidase enzyme inactivated and have a relatively high moisture content.

After the bananas are cut as described above, care should be taken to prevent substantial enzymic discoloration between the time of cutting and the time steam blanching is initiated. This can be effected either by initiating steam blanching immediately after the bananas are cut or treating them to prevent the enzymic reaction involving phenoloxidase or polyphenoloxidase from proceeding. For example, since the enzymic discoloration reaction requires oxygen, the cut bananas can be stored in an oxygen-free atmosphere such as nitrogen. Alternatively, the cut bananas can be treated with a chemical additive known to inhibit enzymic discoloration such as acids or reducing agents including ascorbic acid, citric acid, or sulfiting agents such as sulfur dioxide, copper chelators such as sodium mercaptobenzothiazole or thiourea, substrate analogues such as chlororesorcinol or compounds reactive with early products of enzymic discoloration such as benzenesulfinic acid or glutathione. However, the use of the chemical additives or inert oxygen-free atmospheres is not essential to the process of this invention since the same results can be obtained by effecting steam blanching soon after the bananas are cut. In particular, it is not desirable to employ a sulfiting agent since they impart the undesirable taste to the product described above but the exclusion of a sulfiting agent is not essential to the process of this invention.

The steam-blanched banana slices then are heated in a relatively dry atmosphere to a temperature preferably between about 50° and about 65°C to dehydrate the bananas to a water activity below about 0.6 which corresponds to a moisture content below about 20%. In the dehydration step, the temperature is maintained below about 70°C so that the discoloration of the banana slices resulting from non-enzymic mechanisms, such as carmelizing of sugars therein, is minimized. Generally, the moisture reduction can be accomplished within about 24 hours. Since the desired configuration for handling and proposed uses of the final product is dices having a length of from about 0.1 to 1 inch, the banana slices after being partially dehydrated to less than about 50% moisture content, more generally between 30 and 35%, can be diced to approximate the size of this desired configuration. Dicing at this point facilitates the final stages of dehydration while avoiding the severe damage and flavor loss which occurs if the pulp is diced prior to or immediately after steam blanching. The product can also be diced at completion of dehydration.

The term "water activity" as used herein denotes the ratio between the water vapor pressure exerted by the banana and the vapor pressure of pure water at the same temperature. The water activity of the banana as a function of its moisture content at a specific temperature constitutes a moisture sorption isotherm. This isotherm curve can be an adsorption isotherm or a desorption isotherm. Suitable procedures for obtaining moisture sorption isotherms are described by Taylor, Food Technology, Vol. 15, Page 536 (1961) which is incorporated herein by reference. The reduction of water activity provides an important means for stabilizing food products in preventing or minimizing the growth of bacteria, yeasts and molds in food. In the present invention, the water activity of the banana is reduced to below about 0.6 which corresponds to a moisture content in the banana of about 20 weight percent.

Even when the moisture content of the banana is reduced to the level set forth above, it has been found that the dehydrated banana product is rehydratable back to about 80% of the original moisture content of the fruit. Furthermore, the product of this invention is rehydratable to these moisture levels within a short time in the order of about 10 to 15 minutes at normal room temperature. The rehydratable properties of the product of this invention is surprising since generally when substances such as food containing carbohydrates are dehydrated to the low moisture levels as employed herein, the molecular structure of the carbohydrate is altered in a manner which appears to restrict subsequent water absorption by the substance.

In another aspect, the dehydrated products of this invention have been found to contain a significant proportion of the vaporizable substances which provide the banana with its characteristic aroma and taste. According to gas chromatographic analysis, it has been found that the dehydrated products retain at least about 25% of the major vaporizable constituents that characterize banana aroma and taste.

The dehydrated product has an ivory to light brown color. The color of the banana is believed to be caused by enzymic and non-enzymic discoloration. However, the enzymic discoloration is minimized or eliminated by the process of this invention and the color change effected by non-enzymic discoloration is greatly reduced upon rehydration so that the color of the rehydrated banana is substantially the same as the fresh banana pulp. The color change of the dehydrated banana upon rehydration is due mainly to the fact that pigments of non-enzymic discoloration are water soluble.

As discussed above, the product of this invention, in its rehydrated state retains a substantial portion of the texture and form of the original banana tissure so that it is easily recognizable as such upon visual inspection and when masticated. Furthermore, the dehydrated product of this invention retains its color, low water activity and rehydration properties including texture and aroma retention over long periods of 3 months or more when stored at normal room temperature without special precautions, such as when stored in closed clear glass containers. Furthermore, the dehydrated products of this invention are storage stable even at elevated temperatures such as about 100°F up to about 40 days. The product stored at these elevated temperatures become progressively more brown but this discoloration is reversible in that the brown colored substances are water soluble and when the product is rehydrated, its color reverts to an ivory to light brown color.

The products of this invention can be incorporated into food containing moisture such as cake mixes wherein they can be rehydrated during processing of the foods such as during mixing and baking and the resultant rehydrated banana has essentially the color and texture of ripe banana pulp and retains a substantial proportion of the aroma and flavor of the original fruit.

The following example illustrates the present invention and is not intended to limit the same.

EXAMPLE I

This Example illustrates the necessity of steam blanching the banana pulp tissue to a temperature of at least about 85°C in order to inactivate the enzyme and the necessity of steam blanching a banana having a particular configuration at these temperatures in order to maintain the texture of the banana.

Fully ripe Valery bananas at an advanced stage of ripeness, having a color index of 6 to 7 according to the United Fruit Index were used throughout this example.

The term "whole pulp" refers to uncut banana pulp after peeling. The term "banana discs" refers to whole bananas transversely cut into pieces having a length approximately ¼ inch. The term "banana slices" in this example refers to bananas first halved transversely and then quartered lengthwise.

In order to determine the effect of temperature upon the activity of the enzyme which causes discoloration in the banana, whole banana pulp was blanched to obtain varying temperatures in the banana interiors for varying times and, thereafter, the blanched banana was assayed for residual polyphenoloxidase activity. Whole banana pulp was placed in trays which were then placed in a large steam autoclave. Steam, at 100°C, entered the top of the autoclave and was dispersed by a baffle to prevent direct impingement of the steam on the bananas. Thermocouples were placed in the bananas to monitor the temperature of the banana interior during steam blanching. Bananas were removed from the autoclave periodically after they had attained an interior temperature which had been maintained at varying times as shown in Table I.

The residual activity of the polyphenoloxidase was determined by forming 10 gram samples cut from the transverse section of the center part of the blanched banana and homogenizing the sections in 10 ml., 0.1M phosphate buffer, pH 7 solution which was then centrifuged at 19,000 RPM for 15 minutes. The supernatant solution obtained after centrifugation then was tested with a Rank Oxygen Electrode to determine the polyphenoloxidase activity by measuring the rate of oxygen intake in the presence of the polyphenoloxidase and the dopamine hydrochloride substrate. In this apparatus, oxygen diffuses through a thin teflon membrane and is reduced at a platinum surface immediately under the membrane. The other half-cell, comprising silver-silver chloride, is incorporated in the base of the incubation vessel. Under conditions where no significant access to oxygen gas to the solution in the electrode vessel is effected, the current resulting from the oxygen reduction is proportional to the oxygen concentration in the solution and is measured by an appropriate recorder.

The enzyme solution tested comprised 4.0 ml. added to the electrode vessel. The vessel was stoppered with a cap to prevent significant access of oxygen gas and the cap had a channel to permit entry of a fine syringe needle. A magnetic stirrer was started and when the oxygen trace was steady on the recorder employed (within about 3–5 minutes), 50 microliters of the substrate was added by a syringe. The rate of oxygen utilization by the enzyme system was calculated from the slope of the recorder tracing based upon the assumption that the original air-saturated, enzyme-buffer mixture was $260\mu M$ in oxygen. The recorder line corresponding to 0 oxygen concentration was established by adding excess powdered sodium metabisulfite to the reaction mixture. The final reaction mixture in the assays contained up to 2 ml. of polyphenoloxidase, between 0.005 and 0.025 M phosphate buffer, and $5 \times 10^{-3}$ M dopamine hydrochloride substrate and had a pH of 7.

A whole banana which had not been subjected to steam blanching also was tested for polyphenoloxidase activity and the results obtained therewith constitute the basis for determining the residual activity of the enzyme in the bananas which were steam blanched as shown in Table I.

Table I

| | PPO activity in steam-blanched banana pulp | | | | | |
|---|---|---|---|---|---|---|
| Initial Temperature °C | 75 | 75 | 75 | 85 | 85 | 85 |
| Time in minutes in steam after reaching initial temperature indicated | 0 | 1 | 2 | 0 | 1 | 2 |
| Actual temperature of pulp when taken out of steam | 75 | 83 | 88 | 85 | 87 | 90 |
| Residual activity (% of original) | 36.5 | 0.59 | 0.05 | 0.054 | 0 | 0 |

As shown in Table I, there is a dramatic reduction in the activity of the polyphenoloxidase enzyme when the banana center reaches 85°C. Furthermore, as little as one minute after the banana center reaches 85°C and is maintained at that temperature or above, steam blanching will inactivate the enzyme completely.

In order to obtain a temperature of 85°C at the central portion of the whole banana pulp, it was necessary to maintain the whole bananas in the steam blanching from about 9 to about 10 minutes. Under these conditions of time and temperature, the texture of a significant portion of the banana is destroyed. Similarly, when banana disks exceeded a temperature of 85°C in the central portion, which was within about 30 seconds, the disks stuck to the trays and to each other and substantial tissue damage was noted in the subsequent dehydration step. However, when banana slices which have been halved transversely were treated under the same conditions in the steam blanching step, the temperature in the central portion thereof reached 85°C within 5 to 6 minutes and the texture thereof was maintained as is evident from visual observation of the dehydrated banana slices obtained from the dehydration step describe below.

EXAMPLE II

This example illustrates that the steam blanched banana slices obtained from the procedure described in Example I can be dehydrated to a low moisture content.

The steam blanched banana slices were dehydrated by placing them on trays in an oven and passing heated air at 65°C in contact with the bananas at an air flow rate of between 2,000 and 3,000 feet/minute. The banana moisture content had been reduced to about 30–35 wt. %, when the trays were loaded with 2 lbs. of bananas per tray. The tray measured 19 inches by 27 inches. The time for reaching this moisture level was about 4 hours. When the trays were loaded with 5 lbs. of bananas, the time for reaching this moisture level was about 7 to 10 hours. When the banana moisture level had reached about 30–35 wt. %, they were diced into pieces having a length of about a ⅜ inch and dehyration was continued at an air temperature of about 50°C to reduce the moisture content to about 10 to 20 percent. When the trays contained about 2 lbs. bananas, this lower moisture level required about 6 hours as compared to when the trays were loaded with 5 lbs. of bananas which required about 10 to 11 hours.

EXAMPLE III

This example illustrates that the dehydrated banana slices obtained by the combined procedures of Example I and II have a satisfactory color and low water activity and, when rehydrated, have excellent color, aroma and taste and have a substantial portion of the texture of ripe banana fruit.

The dehydrated bananas obtained had an ivory to light brown color. Surprisingly, when the dehydrated diced bananas were rehydrated with water at room temperature, which required about 10 to 15 minutes, the color improved in that it became lighter so that the rehydrated product had a color substantially identical to ripe banana pulp. The final moisture content of the rehydrated product is about 65 wt. % as compared to about 75–80 wt. % in fresh bananas. It is believed that the rehydrated product became lighter because the browning was caused by non-enzymic discoloration which formed a water-soluble discolored product.

The rehydrated bananas also had evident banana aroma and flavor. The extent of flavor retention was measured by determining the retention of volatiles in the dehydrated samples by comparison of volatiles of fresh bananas.

With the fresh bananas, 50 grams of ripe fruit was sliced into a 250 ml Erlenmeyer flask and the tissue lightly mashed. The flask was sealed with a sheet of heavy aluminum foil and allowed to stand at room temperature for 20 minutes prior to analysis of the headspace above the fruit. A 20 ml. sample of the headspace gas was withdrawn with a gas tight syringe for gas chromatographic analysis. Based upon the level of dehydration of the dehydrated bananas, 12.4 grams of the dehydrated bananas was considered equivalent to 50 grams of fresh bananas. The dehydrated bananas also were placed in a 250 ml. Erlenmeyer flask and sufficient water added to approximate the moisture content of the fresh bananas. The flasks were sealed for 2 hours upon which a 20ml. gas sample was analyzed.

In each instance, the components of the headspace gas was separated in a capillary column, coated with silicone oil (SF–96) (50), and having a 0.02 inch inside diameter and a length of 500 feet. A flame ionization detector with variable attenuation and attached to a recorder was used to detect the components separated by the capillary column. The injected headspace sample was first accumulated in a trap of liquid nitrogen temperature which trap was connected in series with the chromatographic column. Helium carrier gas passed continuously through the trap and the separation column at about 12 ml./min. The trap and contents were held for about 20 minutes in the liquid nitrogen to permit flushing out of the fixed gases and other "noncondensables." The separation column was held at 70°C during this flushing period and after the noncondensables had been flushed out, the detector recorder tray returned to the base line. The trap then was removed from the liquid nitrogen and was immediately heated for two minutes with a strong blast of hot air which caused the headspace volatiles to be carried in a narrow back onto the separating column. Separation was accomplished by programed temperature gas chromotography with an initial temperature of 70°C and a maximum temperature of 230°F heating at a rate of 2°C per minute.

A comparison of the volatiles between the fresh bananas and the dehydrated bananas was made with the following compounds in the volatiles:

| | |
|---|---|
| Acetaldehyde | n-amyl acetate |
| Ethyl acetate | Isobutyl butyrate |
| 2-pentanone | n-butyl butyrate |
| Isobutyl acetate | n-hexyl acetate |
| n-butyl acetate | 2-pentyl butyrate |
| 2-pentyl acetate | Isoamyl butyrate |
| Isoamyl acetate | Isoamyl isovalerate |

The fresh bananas and the rehydrated diced bananas contained approximately the same number of volatile compounds and the relative concentration of the various components is similar. Calculations from the average peak area obtained from the chromatograms show 25–30% retention of the original volatiles in the dehydrated samples.

Since the dehydrated bananas did not fully rehydrate, it was determined that the percent volatile in the rehydrated product varied dependent upon the concentration of water employed to rehydrate the dehydrated bananas. The results obtained above were obtained when adding about 39 ml. of water for rehydration.

The chromatographic data obtained confirms that a significant retention of banana aroma is obtained in the dehydrated products of this invention. Furthermore the chromatograms obtained compared favorably with that reported by Issenberg, Food Technology, 23, beginning at page 103 (1969), which is incorporated herein by reference.

Four samples of dehydrated banana slices obtained as described in this example were tested for storage stability. Two samples had a moisture content of 9% and two samples had a moisture content of 13%. Each of the high and low moisture content samples were stored at 25°C or 37°C for periods of time ranging up to 105 days. Portions of each sample were obtained periodically over the 105 day period stored at −20°F until analyzed. For color analysis 2 grams of the dehydrated sample was mixed with 13 ml. of water and soaked in the water for a minumum of 2 hours to assure that rehydration was completed. The rehydrated bananas in solution were transferred to a pestle homogenizer and the tissue was thoroughly homogenized at 19,000 RPM for 20 minutes. The supernatant was recovered and the solids were washed again with 10 ml. of distilled water and centrifuged again. The supernatant obtained from the second centrifugation was combined with the first supernatant to form a final volume of about 30 ml. The color of the liquid was determined by measuring its light absorbancy at 420 nm. Samples with absorbancy values above 0.20 were noticably brown and considered to be unsatisfactory.

There was no significant browning after 3 weeks of storage in any of the samples. However, with increasing time, more browning was observed at higher moisture content samples and at the higher storage temperature. Thus, the color of the sample with 13% moisture content stored at 37°C became unsatisfactory at about 40 days storage. Both samples stored at 25°C were still satisfactory after 105 days storage. The sample containing 9% moisture stored at 37 °C became unsatisfactory after about 60 days storage. It is believed that the browning observed in the sample stored at higher temperature was caused by non-enzymic mechanisms since it was determined that none of the samples contained any polyphenoloxidase enzyme activity.

We claim:

1. The process for preparing a dehydrated banana having substantial portion of the cellular structure of a ripe banana which comprises slicing a ripe banana lengthwise 1 to 3 times to form a plurality of banana slices having the carpel region exposed along their length, to form slices having the same size contacting said slices with steam to increase the temperature of the interior of said slices up to about 85°C to 95°C for about ½ to 4 minutes, said slices being contacted with steam prior to said slices being substantially discolored due to enzymic discoloration, and dehydrating said steam blanched slices in a relatively dry atmosphere at a temperature from about 50°C to 65°C for a period of time sufficient to reduce the water content of the banana slices to less than about 20 weight percent.

2. The process of claim 1 wherein prior to steam blanching, said slices are sliced transversely from 1 to 2 times to form slices having a substantially equal size.

3. The process of claim 2 wherein the banana slices are cut transversely prior to completing said dehydration step when the moisture content of said slices is less than about 50 weight percent.

4. The process of claim 3 wherein a composition which retards enzymic discoloration is added to the banana slices prior to steam blanching.

5. The process of claim 2 wherein a composition which retards enzymic discoloration is added to the banana slices prior to steam blanching.

6. The process of claim 2 wherein the banana slices are cut transversely prior to completing said dehydration step when the water content of said slices is between about 30 and 35 weight percent.

7. The process of claim 1 wherein the banana slices are cut transversely into the desired configuration prior to completing said dehydration step when the water content of said slices is less than about 50 weight percent.

8. The process of claim 7 wherein a composition which retards enzymic discoloration is added to the banana slices prior to steam blanching.

9. The process of claim 1 wherein the banana slices are cut transversely into the desired configuration prior to completing said dehydration step when the water content of said slices is between about 30 and 35 weight percent.

10. The process of claim 9 wherein a composition which retards enzymic discoloration is added to the banana slices prior to steam blanching.

11. The process of claim 1 wherein a composition which retards enzymic discoloration is added to the banana slices prior to steam blanching.

12. The process of claim 6 wherein a composition which retards enzymic discoloration is added to the banana slices prior to steam blanching.

* * * * *